(12) United States Patent
Rahamim et al.

(10) Patent No.: US 10,003,677 B2
(45) Date of Patent: Jun. 19, 2018

(54) NETWORK APPLICATION VERIFICATION AT A NETWORK PROCESSOR

(71) Applicant: Freescale Semiconductor Inc., Austin, TX (US)

(72) Inventors: Hezi Rahamim, Ramat Gan (IL); Gal Biran, Kfar Saba (IL)

(73) Assignee: NXP USA, Inc., Austin, TX (US)

( * ) Notice: Subject to any disclaimer, the term of this patent is extended or adjusted under 35 U.S.C. 154(b) by 153 days.

(21) Appl. No.: 15/011,604

(22) Filed: Jan. 31, 2016

(65) Prior Publication Data

US 2017/0223152 A1 Aug. 3, 2017

(51) Int. Cl.
*H04L 29/06* (2006.01)
*H04L 12/26* (2006.01)
*G06F 11/36* (2006.01)

(52) U.S. Cl.
CPC ............ *H04L 69/22* (2013.01); *G06F 11/362* (2013.01); *H04L 43/50* (2013.01)

(58) Field of Classification Search
CPC ............................. H04L 69/22; H04W 24/06
See application file for complete search history.

(56) References Cited

U.S. PATENT DOCUMENTS

| | | | |
|---|---|---|---|
| 5,748,878 A * | 5/1998 | Rees ................ | G06F 11/3466 714/38.13 |
| 7,694,110 B1 * | 4/2010 | Alsup ..................... | G06F 9/26 712/211 |
| 7,694,181 B2 | 4/2010 | Noller | |
| 7,734,898 B2 * | 6/2010 | Moyer ................ | G06F 9/30032 712/210 |
| 7,945,418 B2 | 5/2011 | Bose | |
| 8,494,000 B1 * | 7/2013 | Nadkarni .............. | H04L 43/028 370/465 |
| 2007/0061625 A1 | 3/2007 | Acosta | |
| 2008/0037425 A1 * | 2/2008 | Pan ................... | H04L 29/06027 370/235 |
| 2010/0318972 A1 * | 12/2010 | Xu ........................ | G06F 9/3808 717/128 |
| 2011/0134925 A1 * | 6/2011 | Safrai ..................... | H04L 49/35 370/395.53 |
| 2013/0085615 A1 * | 4/2013 | Barker .................. | A61G 10/00 700/277 |
| 2013/0191823 A1 * | 7/2013 | Davidson ................ | H04L 67/34 717/178 |
| 2014/0075242 A1 * | 3/2014 | Dolinina ............. | G06F 11/3672 714/27 |

OTHER PUBLICATIONS

U.S. Appl. No. 14/856,970, filed Sep. 17, 2015 listing Hezi Rahamim et al) as inventor(s), entitled "Creating and Using Customized Network Applications".

\* cited by examiner

*Primary Examiner* — Benjamin Lamont (57) ABSTRACT

A network application is verified at a network processor by selecting network application functions based on a field of an ingress packet. The network application is composed of a set of network application functions, with each function carrying out a corresponding packet processing operation, such as packet parsing, statistical gathering, and the like. Each network application function can be invoked by the network processor with a corresponding command. Based on a field of an ingress packet, the network processor can select a sequence of functions to process the packet, wherein the sequence corresponds to functions of the network application or a portion thereof.

15 Claims, 4 Drawing Sheets

NETWORK APPLICATION VERIFICATION AT A NETWORK PROCESSOR

BACKGROUND

Field of the Disclosure

The present disclosure relates generally to network processors and more specifically to network application verification.

Description of the Related Art

A network processor is a processor that has been specifically designed or programmed to process packets received via one or more networks. For each received packet, the network processor executes one or more sets of instructions, referred to as network applications, to carry out one or more operations based on the packet, such as packet classification, packet routing, dropping or blocking of a packet (firewall operations) and the like. To ensure proper processing of received packets, each network application is typically verified before the network application is employed during normal in-situ packet processing. Verification of a network application typically involves sending one or more test packets to the network processor, processing the test packets with the network application, and comparing one or more outputs of the network application to one or more expected results. However, it is difficult for the test packets to fully emulate the wide variety of packets that can be received by the network processor during normal operation, and therefore difficult to fully verify the network application. Further, because of the complexity of the network application, it is difficult to identify the particular aspect or feature of the network application that is the source of any errors identified during verification.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-5 illustrate techniques for verifying a network application at a network processor by selecting network application functions based on a field of an ingress packet. The network application is composed of a set of network application functions, with each function carrying out a corresponding packet processing operation, such as packet parsing, statistical gathering, and the like. Each network application function can be invoked by the network processor with a corresponding command. Based on a field of an ingress packet, the network processor can select a sequence of commands to process the packet, wherein the sequence corresponds to functions of the network application or a portion thereof. Because the sequence of commands, and therefore the invoked network application functions, is selected based on a field of the ingress packet (rather than based on a fixed test process), that field can be set to verify operation of the network application for a wide variety of packets and conditions, improving network application verification.

To illustrate via an example, during normal operation the network processor can receive a wide variety of packets containing a wide variety of data. This variety can cause the network application to exhibit a wide variety of behaviors, including invoking different network application functions in different order, passing different data parameters between network application functions, and the like. Each behavior corresponds to a particular sequence of network application functions. To ensure proper operation of the network application, it is desirable to verify the network application under as many of these behaviors as possible under a given set of time and cost constraints. Conventionally, the network application is verified by applying a wide variety of different test packets to the application, in the hopes that this variety will invoke a corresponding variety of sequences of network application functions. However, it is typically difficult to generate a sufficient variety of test packets to invoke all of the possible network application function sequences. In contrast, using the techniques described herein, particular desired sequences of network application functions can be selectively invoked, improving control over the verification process and ensuring that the network application is verified for a wider variety of potential packets. In addition, using the techniques described herein, test results can be individually generated by each network application function to provide a better indication of which function or functions may be causing an error.

Figure 1:
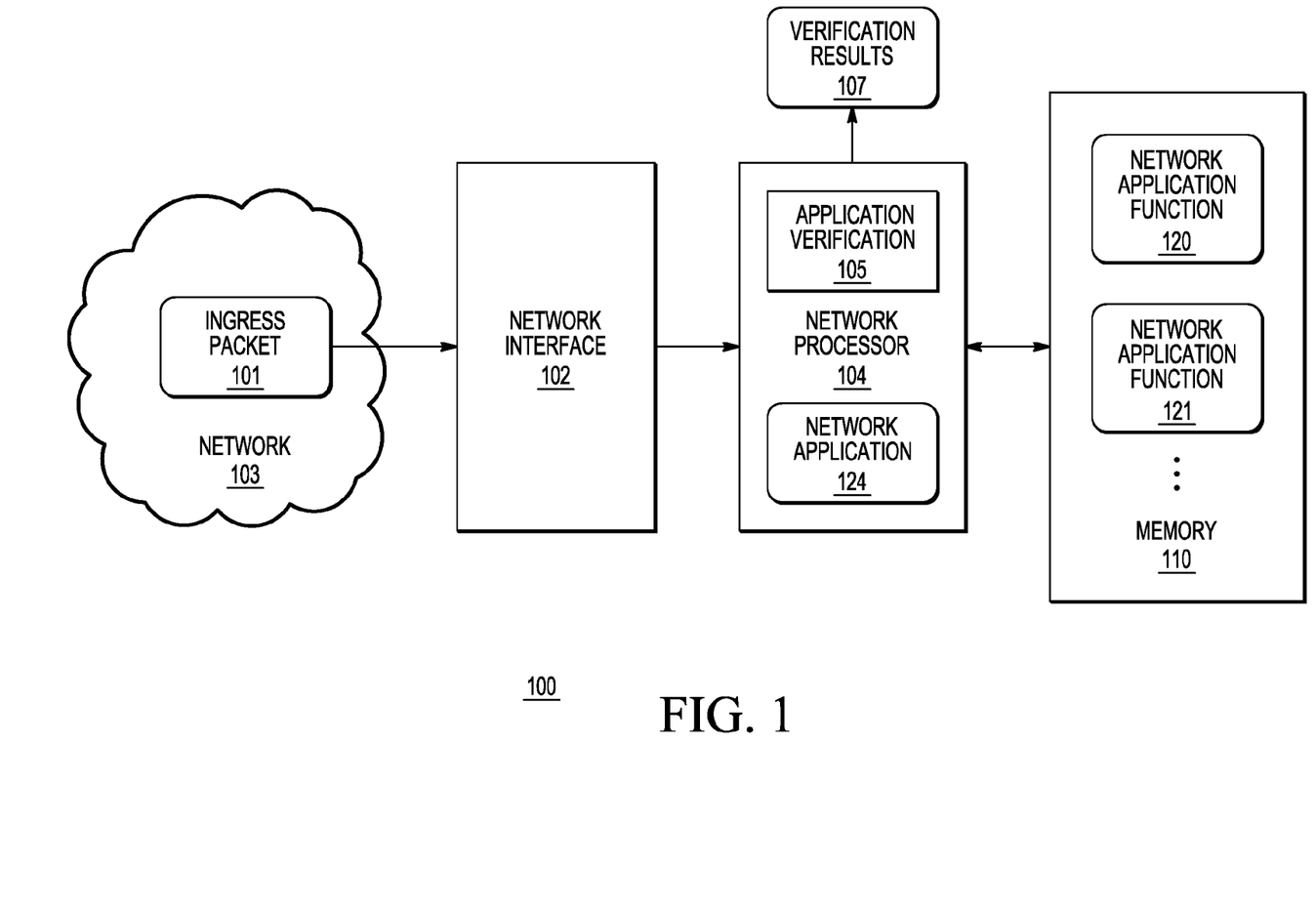
FIG. 1 is a block diagram of a network device 100 that verifies a network application by selecting network application functions based on an ingress packet field in accordance with at least one embodiment.

FIG. 1 illustrates a network device 100 in accordance with at least one embodiment. The network device 100 can be any of a number of network devices, such as a router, a network switch, a hardware firewall, a session border controller, a network monitoring device, a network security device such as a network intrusion detector, and the like. The network device 100 is generally configured to receive packets, referred to as ingress packets (e.g., ingress packet 101) from a connected network 103 such as a local area network (LAN) or wide area network such as the internet and execute a network application 124 to process each ingress packet. In at least one embodiment, the network application performs a series of operations for each ingress packet, including parsing the packet, classifying the packet, collecting statistics on the packet, routing the packet to an output port, and the like. The particular sequence of operations may vary depending on the contents of the ingress packet's header, data payload, or combination thereof. For purposes of further description, it is assumed that the network device 100 is a router whose primary function is to route received packets to one or more output ports based on address fields of the received packets. Thus, the network application executed by the network device 100 is generally directed to identifying the output ports for each received packet based on the address fields.

To facilitate processing of ingress packets by the network application, the network device 100 includes a network interface 102, a network processor 104, and a memory 110 The network interface 102 is hardware generally configured to receive packets from and communicate packets to the connected network. The network interface 102 therefore provides at least a physical (PHY) layer interface to the network, and can additionally perform one or more operations for higher layers of the Open Systems interconnection (OSI) model. In at least one embodiment, the network interface 102 is generally configured to have a plurality of input ports to receive packets from the network and a plurality of output ports to communicate packets to the network. The input and output ports may each be associated with individual hardware connections to the network, or may be virtualized ports that share the individual hardware connections.

The memory 110 includes a set of one or more memory modules configured to store and retrieve data in response to corresponding memory access requests. Accordingly, the memory 115 can be volatile memory such as random access memory (RAM), non-volatile memory such as Flash memory, and the like, or a combination thereof. The memory 115 stores network application functions (e.g. network application functions 120, 121) that together compose the network application executed by the network device 100. Each of the network application functions performs a corresponding processing operation on an ingress packet. Examples of the network application functions include a table lookup function, packet parser function, statistical gathering functions, if statement functions, packet header and packet payload modification functions, checksum calculation and validation functions, packet forwarding functions (e.g. forwarding a packet to an output port of the network interface 102), packet drop functions, packet-type processing functions (e.g., Internet Protocol (IP) Security (IPSec), generic receive offload (GRO), generic segmentation offload (GSO), IP fragmentation (IPF), and IP filter functions), traffic policing functions, and traffic shaping functions. For purposes of description of FIG. 1, the network application functions of FIG. 1 are software instructions that, when executed at the network processor 104, performs a corresponding operation. However, it will be appreciated that in some embodiments one or more of the network application functions can be a hardware module composed of one or more circuits that together perform the corresponding operation. In at least one embodiment, the network processor 104 is a pipeline processor having a plurality of cores, such as general processor core or application specific processor cores, each configured to process the packet header for particular information During normal (non-test) operation of the network device 100 receives ingress packets via the network interface 102. For each received ingress packet the network processor 104 executes the network application of the network device 100 by executing one or more of the network application functions. The particular sequence of network application functions executed by the network processor 104 depends upon the contents of the ingress packet. To illustrate via an example, in at least one embodiment for each received ingress packet the network processor 104 first executes a parser network application function to identify the contents of a header field of the packet. The network processor 104 then executes a switch case network application function to select a packet processing function (e.g. to select one of an IPSec network application function and a GRO network application function), or multiple functions, based on the header field. The network processor 104 then executes the selected packet processing function to process the ingress packet. Thus, the particular sequence of executed network application functions for an ingress packet can vary depending on the contents of the packet. The network application is composed of all the possible sequences of network application functions that can be executed. In at least one embodiment, the packet classification indicates a code entry point to as set of code used to process the packet.

To support development and implementation of useful and robust network applications, the network processor 104 includes an application verification module 105 to enable verification of the network application based on ingress test packets. In at least one embodiment, the application verification module 105 is a set of software instructions that, when executed by the network processor 104, carry out the operations described further herein. In another embodiment, one or more of the operations of the application verification module 105 can be carried out by hardware specifically designed and implemented to carry out the operation.

The application verification module 105 is configured to identify whether an ingress packet is a test packet based on a field of the packet itself, based on an indication (e.g. a hardware or software flag) at the network device 100 that the device is a test mode, or based on another indication. In at least one embodiment, such as when the network device 100 is in a verification phase of development or manufacturing, the application verification module 105 identifies all ingress packets as test packets, without identifying a separate test packet indication. In response to identifying that an ingress packet is a test packet, the application verification module parses a specified field, referred to herein as a test code field, of the packet. Based on the test code field, the application verification module 105 selects a corresponding sequence of the network application functions stored at the memory 110. The network processor 104 then executes the selected sequence of network application functions to process the ingress test packet.

In at least one embodiment, each of the network application functions can be invoked for execution at the network processor 104 with a corresponding command. Each of the commands can include, for example, a pointer to a memory location of the memory 110 that includes the first instruction of the network application function, and can include an op code that, when executed at the network processor 104, initiates execution of the corresponding network application function. As described further herein, the application verification module 105 can include a memory to store sequences of commands to invoke corresponding sequences of network application functions. The test code in an ingress test packet can be a pointer to the memory, indicating the first command in the sequence of commands to be invoked.

The processing of the ingress packet according to the selected sequence of network application functions generates verification results 107, which can then be analyzed by the application verification module 105 or by an external tester (not shown) or a user to identify any errors in execution of the selected sequence. In at least one embodiment, each of the network application functions in the selected sequence generates a separate individual portion of the verification results 107. By providing such granular verification results, the particular network application function that is causing a processing error can be identified more quickly that in a conventional verification process, where only the output of the last executed network application function is available for analysis.

In at least one embodiment, the verification results 107 are stored in a field of the test packet itself and the test packet output to a tester via the network interface 102. This supports a testing procedure wherein a series of test packets are supplied to the network processor 104, and the resulting output test packets individually analyzed to identify which network application sequences resulted in errors or unexpected behavior. In at least one other embodiment, the verification results 107 are stored in an external memory for access by the tester, and the tester matches individual entries of the verification results 107 with received output test packets to identify potential errors. The test codes of the series of test packets can be configured to select for a wide variety of expected network application functions, thereby verifying operation of the network application for a correspondingly wide variety of expected packets. Further, because specific sequences of network application functions can be selected with the corresponding test codes, these specific sequences can be tested more efficiently than in a conventional process, wherein specific sequences can only be triggered by constructing a test packet with appropriate, and potentially difficult to identify, header information or payload.

Figure 2:
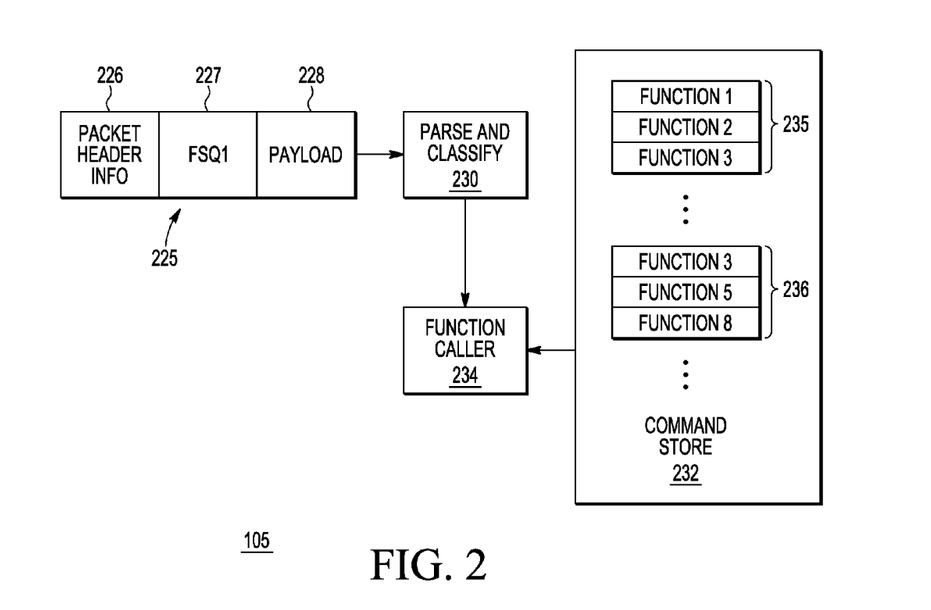
FIG. 2 is a block diagram of an application verification module of FIG. 1 in accordance with at least one embodiment.

FIG. 2 illustrates a block diagram of the application verification module 105 in accordance with at least one embodiment. In the depicted example, the application verification module 105 includes a parse and classify module 230, a command store 232, and a function caller 234. The command store 232 is a memory, such as flash memory or random access memory, that stores sets of commands (e.g., command sets 235, 236) wherein each set of commands includes one or more commands that, when executed, invoke corresponding network application functions. Thus, in the depicted example, the command set 235 includes commands to invoke network application functions designated "FUNCTION1", "FUNCTION2", AND "FUNCTION3". As described further herein, the command sets support execution of corresponding sequences of network application functions to verify one or more aspects of operation of the network application of the network device 100. Accordingly, in at least one embodiment, the command sets are developed by a test engineer to verify specified aspects of operation of the network application. The developed command sets can then be loaded into the command store 232 by a device testing environment (not shown), such as a testing workstation. In some scenarios, all of the aspects of operation of the network application cannot be tested with predefined sequences of commands; rather, some aspects can only be tested using random command sequences. Accordingly, in at least one embodiment the device testing environment can generate random command sequences, and store the random command sequences as command sets at the command store 232.

The parse and classify module 230 is configured to parse ingress test packets such as ingress test packet 225. Each ingress test packet includes a number of fields, including packet header fields (e.g., packet header fields 226 of ingress test packet 225), a test code field (e.g., test code field 227 of ingress test packet 225), and a payload field (e.g., payload field 228 of ingress test packet 225). The packet header fields include packet header information, such as source address information, destination address information, quality of service (QoS) information, and the like (note that although for clarity the test code field is depicted separately from the packet header fields in FIG. 2, in at least one embodiment the test code field is included in the packet header fields). The payload field stores the data payload of the packet, such as the data being carried by the packet to the destination address.

The test code field stores a test code indicative of a memory address for an initial command of one of the command sets at the command store 232. It will be appreciated that although the test code field 227 is illustrated as separate from the packet header fields 226, in at least one embodiment the test code field 227 is embedded in the packet header fields 226. For example, the test code field 227 can be generated from existing packet header fields, such as a combination of a media access control (MAC) header field and a virtual local area network (VLAN) field. The parse and classify module 230 is generally configured to parse each received ingress test packet to identify the test code stored at the test code field. In at least one embodiment, the test code itself is the address of the initial command of the command set. In at least one other embodiment, the parse and classify module 230 identifies the memory address by applying a specified function, such as a hash function, to the test code. The parse and classify module 230 supplies the memory address to the function caller 234.

The function caller 234 is configured to receive the memory address from the parse and classify module 230 and call, in sequence, the functions corresponding to the commands in the command set. In particular, for each command the function caller 234 identifies the corresponding network application function, retrieves the function from the memory 110, and provides the function to an instruction pipeline of the network processor 104 for execution. In at least one embodiment the function caller 234 provides a "wrapper" for each called function by passing parameters between the called functions.

Figure 3:
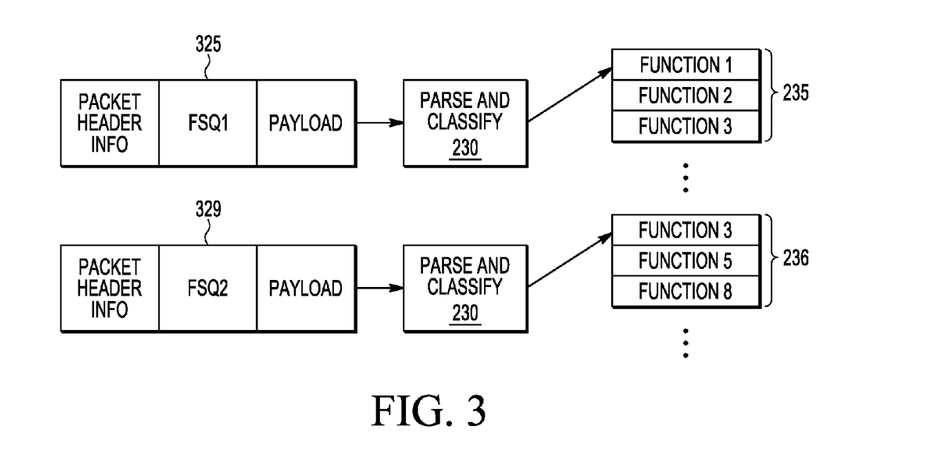
FIG. 3 is a block diagram illustrating an example operation of the application verification module of FIG. 2 in accordance with at least one embodiment.

FIG. 3 illustrates an example operation of the application verification module 105 in accordance with at least one embodiment. In the depicted example, the application verification module 105 receives, at different times, ingress test packets 325 and 329. Ingress test packet 325 includes a test code corresponding to command set 235 and ingress test packet 329 includes a test code corresponding to command set 236. Accordingly, in response to receiving ingress test packet 325, the parse and classify module 230 identifies the test code and provides the memory address for the initial command of command set 235 to the function caller 234. In response, the function caller 234 invokes, in sequence, the network application functions corresponding to the commands of command set 235. Thus, the function caller 234 invokes FUNCTION 1, followed by FUNCTION 2, followed by FUNCTION 3. In at least one embodiment, each of the functions generates output data, which can be individually stored and compared to expected test data to identify if each function is performing according to a specification.

In response to receiving ingress test packet 329, the parse and classify module 230 identifies the corresponding test code and provides the memory address for the initial command of command set 236 to the function caller 234. In response, the function caller 234 invokes, in sequence, the network application functions corresponding to the commands of command set 236. Thus, the function caller 234 invokes FUNCTION 3, followed by FUNCTION 5, followed by FUNCTION 8. Thus, the test codes for each received ingress test packet control the sequence of network application functions that are executed for the ingress test packet. This supports a refined level of control as to which network applications are executed, and in which order. The refined level of control in turn allows for efficient verification of a wide variety of aspects of operation of the network application.

Figure 4:
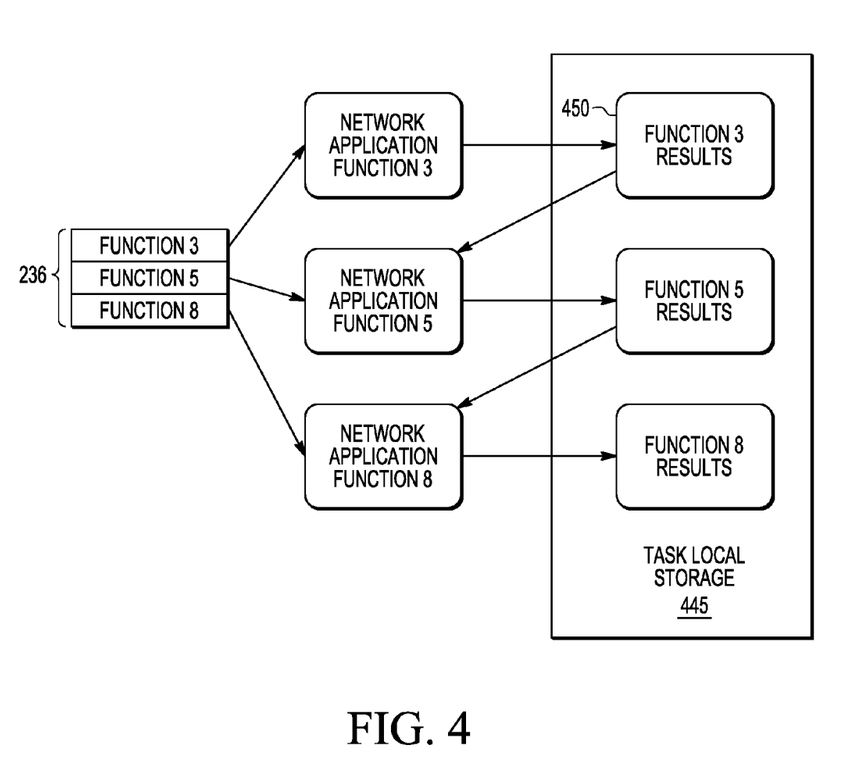
FIG. 4 is a block diagram illustrating an example of the application verification module of FIG. 2 storing results of individual network application functions in accordance with at least one embodiment.

FIG. 4 illustrates an example of storing results for individual functions invoked by a sequence of commands in accordance with at least one embodiment. In the depicted example, results output by each function are stored at task local storage 445. In at least one embodiment, the task local storage 445 is a region of the memory 110 designated to store data for the application verification module 105. For this example, the function caller 234 is invoking the functions corresponding to command set 235: network application functions designated FUNCTION 3, FUNCTION 5, and FUNCTION 8. As each of the network application functions is executed, the output data for the function is individually and separately stored at the task local storage 445. For example, the output data for FUNCTION 3 is stored at the task local storage 445 as FUNCTION 3 results 450. The output data can be any output parameter for the function, such as a routing port number, a packet address modification, a QoS value, traffic shaping or security information, and the like. In at least one embodiment, only the subset of the output data for the function needed to be accessed by subsequent functions is stored at the task local storage, with the full output data for the function stored to external memory for subsequent review and analysis.

Storing the output data for each function separately allows for a more granular analysis of network application behavior, thereby improving the verification process. For example, in response to an output packet of the network application not matching an expected output, the individual function output data for each function can be analyzed to identify the source of the error. In addition, by storing the output data for each function at the task local storage 445, the network processor 104 can dynamically pass data between functions.

Figure 5:
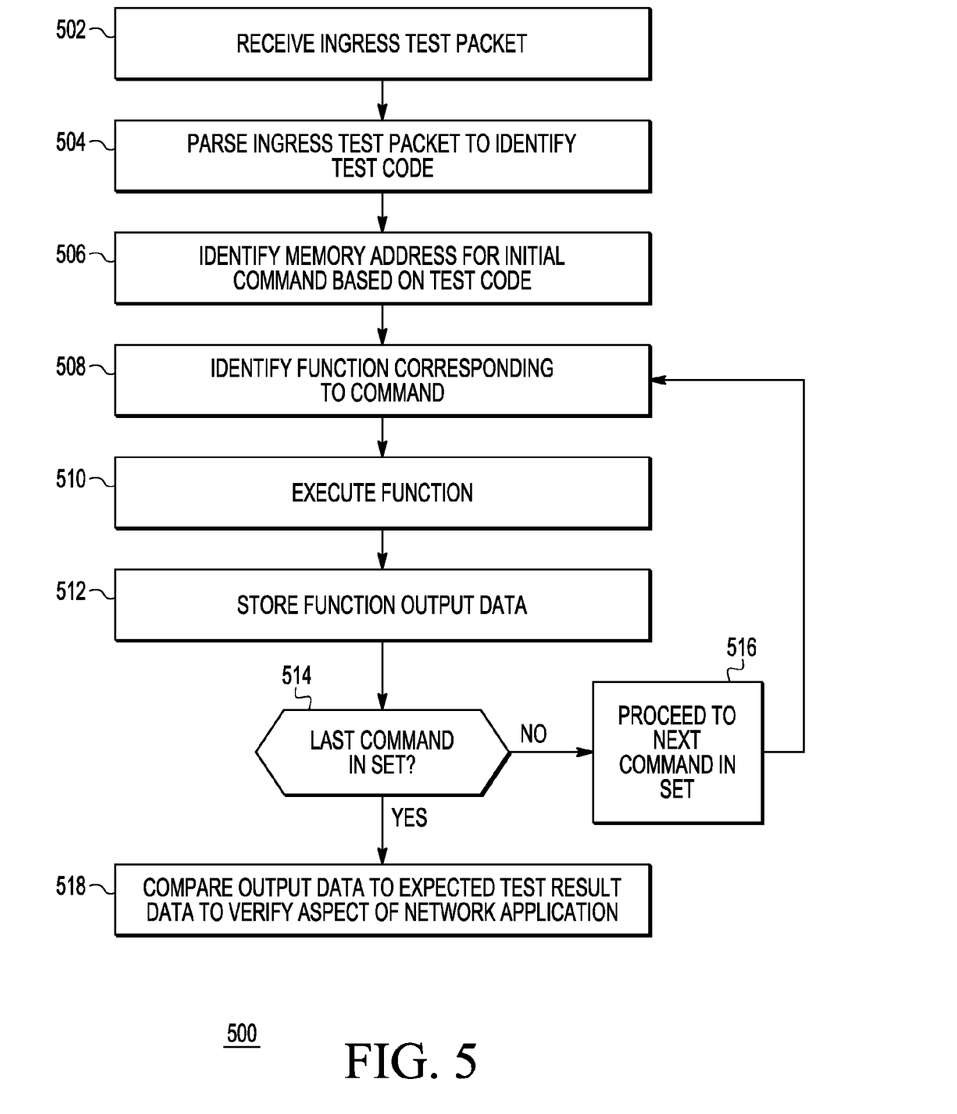
FIG. 5 is a flow diagram of a method of verifying a network application by selecting network application functions based on an ingress packet field in accordance with at least one embodiment.

FIG. 5 illustrates a flow diagram of a method 500 of verifying a network application by selecting network application functions based on an ingress packet field in accordance with at least one embodiment. For purposes of description, the method 500 is described with respect to an example implementation at the network device 100 of FIG. 1. At block 502, the network processor 104 receives an ingress test packet. At block 504, the parse and classify module 230 (FIG. 2) of the application verification module 105 parses and classifies the ingress test packet to identify the test code stored in a header of the packet. At block 506, the parse and classify module 230 identifies a memory address at the command store 232 indicated by the test code. This memory address reflects a memory location storing an initial command in a command set.

At block 508 the function caller 234 identifies a network application function indicated by the command at the identified memory address. In at least one embodiment, each command at the command store 232 includes an identifier code for the corresponding function, and the function caller 234 stores a set of memory addresses corresponding to the identifier codes, wherein each memory address indicating the location at the memory 110 where the function corresponding to a given code is stored. At block 510 the function caller 234 loads the network application function indicated by the command at an instruction pipeline of the network processor 104, which executes the loaded function using the ingress test packet. At block 512 the function caller 234 stores any output parameters of the executed network application function at the task local storage 445.

At block 514 the function caller 234 determines whether the current command is the last command in the command set. In at least one embodiment, the last command in a command set includes a code value indicating either 1) the next command in the command set or 2) that it is the last command, and the function caller 234 identifies the last command in a set based on this code value. If the current command is not the last command, the method flow moves to block 516 and the function caller 234 selects the next command in the command set as the current command. The method flow returns to block 508 so that the function caller 234 can execute the next network application function.

Returning to block 514, in response to identifying that the current command is the last command in the command set, the method flow moves to block 518 and the network processor outputs the network application function results (as stored at block 512) as verification results. In at least one embodiment, these verification results include the individual output data for each executed function, and are provided in a field of the test packet. The verification results are compared (e.g., by a test environment) to a set of expected rest results to verify at least one aspect of the network application of the network device 100.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A non-transitory computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   receiving a first ingress packet at a network processor;
   selecting, at the network processor, a first plurality of network application functions based on a field of the first ingress packet, wherein
      said selecting comprises selecting a starting network application function of a stored sequence of network application functions based on the field of the first ingress packet, and
      the stored sequence of network application functions comprises a random sequence of network application functions; and
   applying, at the network processor, the first plurality of network application functions to the first ingress packet to verify a first aspect of operation of a network application, wherein
      said applying comprises applying the stored sequence of network application functions beginning at the starting network application function.

2. The method of claim 1, further comprising:
   receiving a second ingress packet at the network processor;
   selecting, at the network processor, a second plurality of network application functions based on a field of the second ingress packet, the second plurality of network application functions different from the first plurality of network application functions; and
   applying, at the network processor, the second plurality of network application functions to the second ingress packet to verify a second aspect of operation of the network application.

3. The method of claim 1, wherein the selecting the first plurality of network application functions comprises selecting an order of the first plurality of network application functions based on the field of the first ingress packet.

4. The method of claim 1, wherein the field of the first ingress packet comprises an address indicating an initial network application function of the stored sequence of network application functions.

5. The method of claim 1, wherein applying the first plurality of network application functions comprises storing a plurality of results for each network application function of the first plurality of network application functions, and further comprising:

verifying the first aspect of operation of the network application based on the stored plurality of results.

6. The method of claim 5, wherein the first plurality of network application functions comprises a first network application function and a second network application function, and wherein applying the first plurality of network application functions comprises:
   accessing the stored plurality of results to dynamically pass parameters from the first network application function to the second network application function.

7. A method, comprising:
   for each of a plurality of ingress packets received at a network processor:
      selecting a stored sequence of a plurality of stored sequences of network application functions based on a field of the ingress packet, wherein at least one of the plurality of stored sequences is a randomly generated sequence of network application functions; and
      executing the selected stored sequence at the network processor to verify operation of a network application.

8. The method of claim 7, wherein the selecting comprises identifying a memory address based on the field of the ingress packet.

9. The method of claim 7, further comprising:
   providing results of at least one of the executed selected sequences via an output packet comprising a modification of a corresponding ingress packet.

10. A network node comprising at least one network processor configured to:
    receive a first ingress packet;
    select a first plurality of network application functions based on a field of the first ingress packet;
    select an initial function of a stored sequence of network application functions based on the field of the first ingress packet, wherein the stored sequence of network application functions comprises a random sequence of network application functions;
    apply the first plurality of network application functions to the first ingress packet to verify a first aspect of operation of a network application; and
    apply the stored sequence of network application functions beginning at the initial function.

11. The network node of claim 10, wherein the at least one network processor is to:
    receive a second ingress packet;
    select a second plurality of network application functions based on a field of the second ingress packet, the second plurality of network application functions different from the first plurality of network application functions; and
    apply the second plurality of network application functions to the second ingress packet to verify a second aspect of operation of the network application.

12. The network node of claim 10, wherein the at least one network processor is to select an order of the first plurality of network application functions based on the field of the first ingress packet.

13. The network node of claim 10, wherein the field of the first ingress packet comprises an address indicating an initial function of the stored sequence of network application functions.

14. The network node of claim 10, wherein the at least one network node is to verify the first aspect of operation of the network application based on the stored plurality of results.

15. The network node of claim 14, wherein the plurality of network application functions comprises a first network application function and a second network application function, and wherein at least one network node is to access the stored plurality of results to dynamically pass parameters from the first network application function to the second network application function.

\* \* \* \* \*